United States Patent [19]
Ichiko et al.

[11] 4,054,945
[45] Oct. 18, 1977

[54] ELECTRONIC COMPUTER CAPABLE OF SEARCHING A QUEUE IN RESPONSE TO A SINGLE INSTRUCTION

[75] Inventors: Takao Ichiko; Yusuke Tsuji, both of Tokyo, Japan

[73] Assignee: Nippon Electric Co., Ltd., Tokyo, Japan

[21] Appl. No.: 699,132

[22] Filed: June 23, 1976

[30] Foreign Application Priority Data

June 24, 1975 Japan .............................. 50-76782

[51] Int. Cl.² ............................................. G06F 7/00
[52] U.S. Cl. .................................................. 364/200
[58] Field of Search ...................................... 340/172.5

[56] References Cited

U.S. PATENT DOCUMENTS

| | | | |
|---|---|---|---|
| 3,461,434 | 8/1969 | Barton et al. | 340/172.5 |
| 3,699,528 | 10/1972 | Carlson et al. | 340/172.5 |
| 3,778,776 | 12/1973 | Hakozaki | 340/172.5 |
| 3,938,096 | 2/1976 | Brown et al. | 340/172.5 |

*Primary Examiner*—Gareth D. Shaw
*Assistant Examiner*—Thomas M. Heckler
*Attorney, Agent, or Firm*—Sughrue, Rothwell, Mion, Zinn and Macpeak

[57] ABSTRACT

An electronic computer comprises a memory for a plurality of list components, each comprising pointer and data fields. A single instruction specifies a base and a hardware register and contains an offset datum. Particular data fields, one in each list component, contain particular data, respectively, which are to be searched by the instruction as a queue. Particular pointer fields, one in each list component, contain pointers, respectively, each pointer specifying relative to the content of the base register the particular pointer field of the list component. The pointer field includes the datum that next follows in the queue a particular datum included in a list component together with the pointer. Responsive to the contents of the base and hardward registers, a control unit of the computer successively reads the pointers and loads the hardward register with the successively read-out pointers, one at a time. Responsive to the contents and the offset datum, the control unit reads the particular data sequentially in the order of the queue.

5 Claims, 9 Drawing Figures

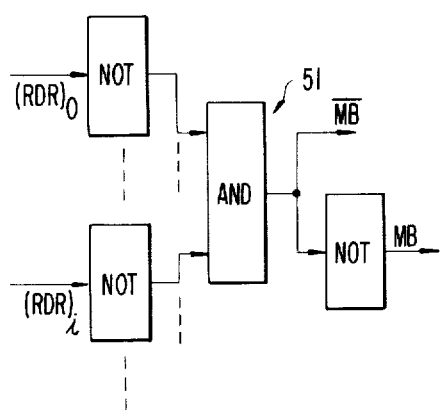
FIG.7
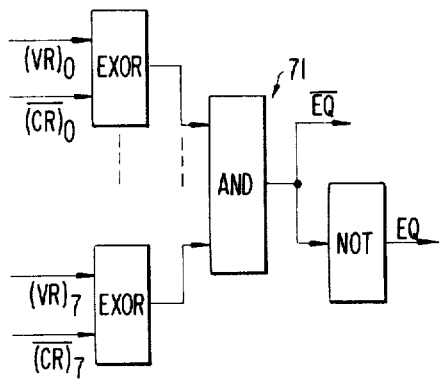
FIG.8
FIG.9
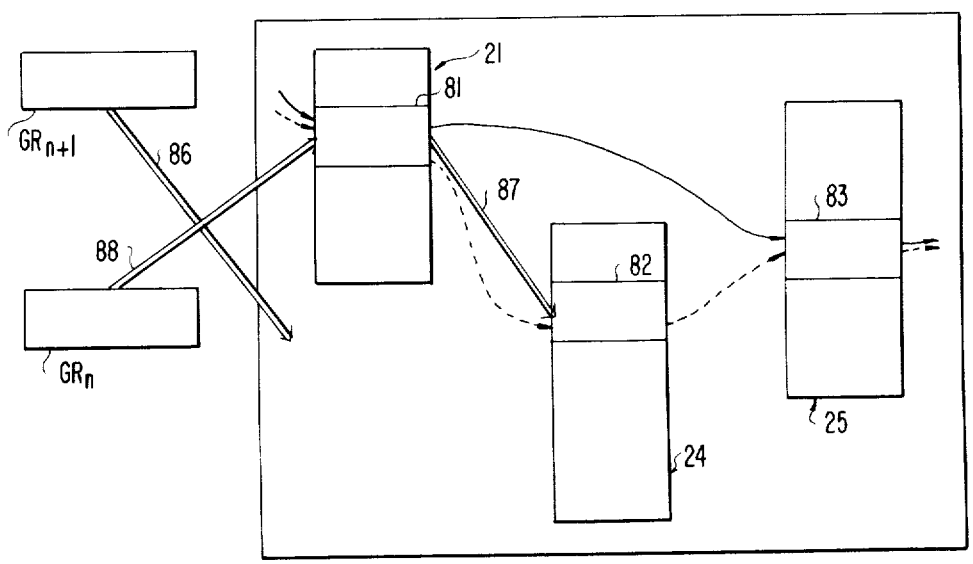

ELECTRONIC COMPUTER CAPABLE OF SEARCHING A QUEUE IN RESPONSE TO A SINGLE INSTRUCTION

BACKGROUND OF THE INVENTION

This invention relates to an electronic digital computer comprising facilities for searching a queue.

An electronic digital computer is known in the art, which comprises a main memory memorizing a plurality of list components having data for a plurality of queues and further comprises facilities for searching a desired one of the queues. In many cases, a desired queue is searched to check whether or not a preselected datum is present in the desired queue or to rewrite the preselected datum. At any rate, it is desirable to search a desired queue at a high speed with ease in order to improve the performance of an electronic digital computer. It has, however, been the practice to locate a preselected datum by a combination of a plurality of instructions, such as LOAD, COMPARE, and BRANCH instructions. This has inevitably resulted in a loss of the machine time and a difficulty in searching the desired queue particularly when the list components have the data in complicated data structure.

SUMMARY OF THE INVENTION

It is therefore an object of the present invention to provide an electronic digital computer which comprises a memory for memorizing a plurality of list components having data for a plurality of queues and further comprising facilities for searching a desired one of the queues at a high speed and with ease without much modification of the hardware of the computer.

It is another object of this invention to provide an electronic digital computer of the type described, wherein the facilities are operable by a single instruction of a format common to other instructions.

In accordance with this invention, there is provided an electronic digital computer capable of searching a queue in response to a single instruction for the queue. The instruction comprises a base datum specifying a base address, a pointer datum, and an offset datum. The computer comprises a memory, which may be a main memory, for memorizing a plurality of list components, each comprising at least one pointer field and a plurality of data fields. The list components have pointers in particular ones of the pointer fields, respectively, one in each list component, and have particular data comprised by the queue in particular ones of the data fields, respectively, one in each list component. The pointer datum specifies the particular pointer field of the next list component in the queue. Each pointer specifies, relative to the base address, the particular pointer field of one of the list components that has a particular datum next following in the queue another particular datum. The offset datum specifies the particular data field of each list component relative to the particular pointer field of the said each list component. Responsive to the base and pointer data, first means of the computer successively reads the pointers out of the particular pointer fields. Responsive to the base datum, the pointer datum and the successively read-out pointers, and the offset datum, second means of the computer sequentially reads the particular data out of the particular data fields.

The memory may memorize additional list components, each comprising at least one pointer field and a plurality of data fields. The additional list components have pointers in the respective pointer fields and data in the respective data fields. In these respects, the additional list components are quite similar to the list components described in the next preceding paragraph and herein called particular list components to distinguish them from the additional list components. Together with the pointers and the data had by the particular list components, the pointers and data had by the additional list components are for a plurality of queues including the above-mentioned queue which is now called a particular queue. The aforesaid pointers are now named particular pointers. Like the particular queue, each of the plurality of queues comprises predetermined ones of the data, one from a predetermined one of the data fields of each of predetermined ones of the particular and/or additional list components.

According to a few aspects of this invention, it is possible with a single instruction to locate a specific one of the particular data, to compare the specific datum with a given list component, delink the specific datum from the particular queue, or to link a desired list component in an optional position in the particular queue.

BRIEF DESCRIPTION OF THE DRAWINGS

The invention will be described in more detail with reference to the accompanying drawings in which:

FIG. 7 is a block diagram of a first comparator of the computer;

FIG. 8 is a block diagram of a second comparator of the computer; and

FIG. 9 schematically shows the principles of link and delink operations of the computer.

DESCRIPTION OF THE PREFERRED EMBODIMENTS

Figure 1:
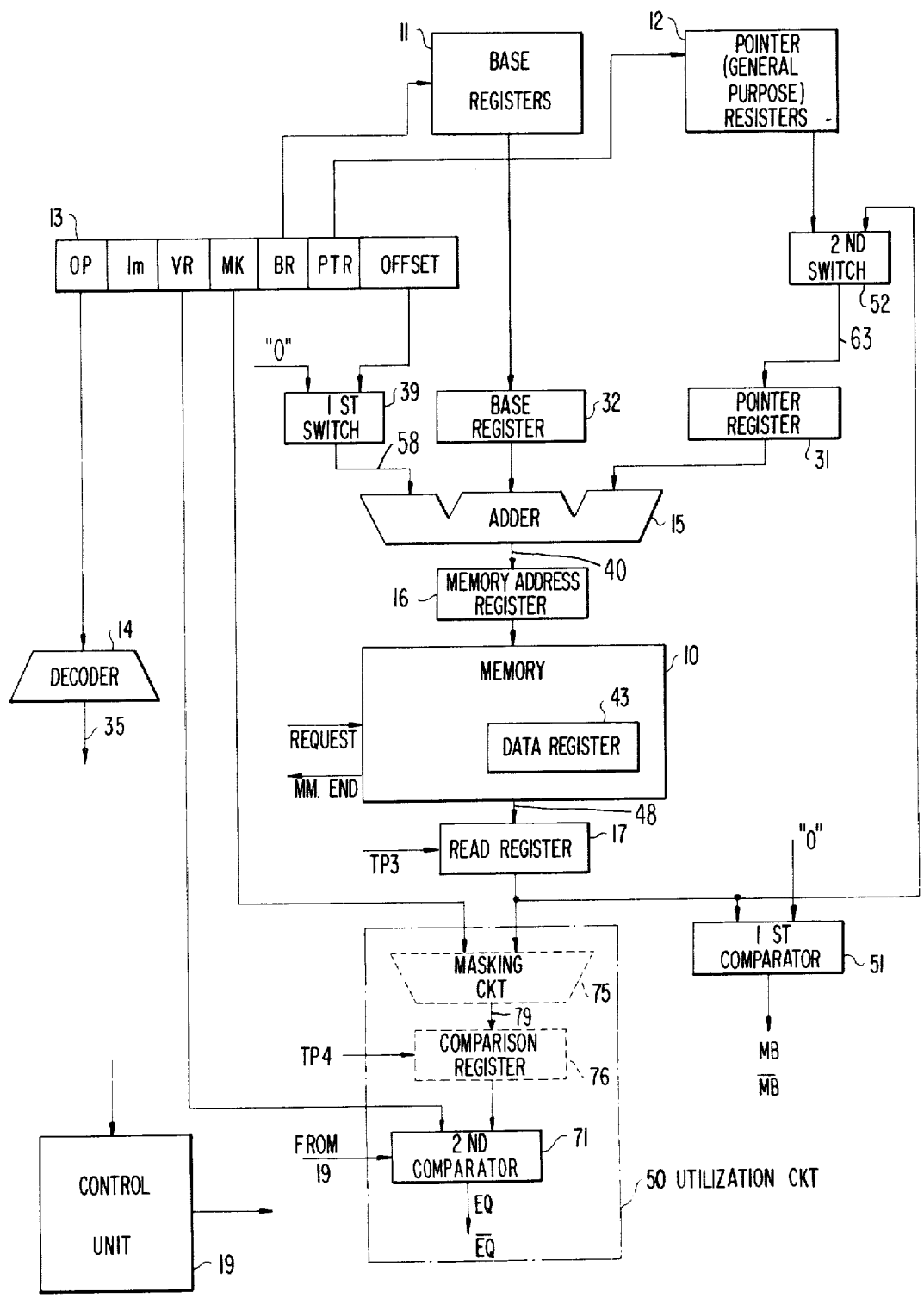
FIG. 1 is a block diagram of an electronic digital computer according to a preferred embodiment of the instant invention.
Figure 2:
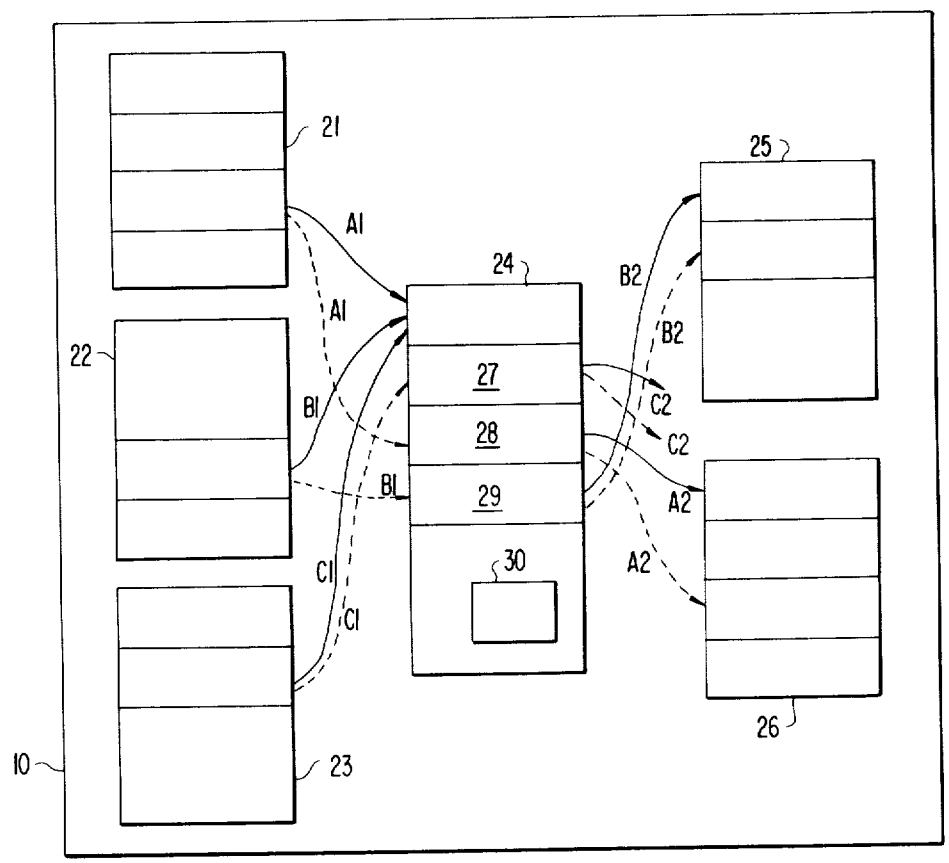
FIG. 2 schematically shows a plurality of list components stored in a main memory of the computer.

Referring to FIGS. 1 and 2, an electronic digital computer according to a preferred embodiment of the present invention comprises a main memory 10, a group of base registers 11, a group of general purpose registers, some of which are used as pointer or hardware registers 12 as called herein, an instruction register 13, a decoder 14 for an instruction with which the instruction register 13 is loaded, an adder 15 for calculating the address of a location in the main memory 10, a memory address register 16, a read register 17, and a control unit 19, all known in the art. As best shown in FIG. 2, the main memory 10 memorizes a plurality of list components 21, 22, 23, 24, 25, and 26, some of which are the particular list components mentioned hereinabove. By way of mere example, the list component 24 comprises three pointer fields 27, 28, and 29 and a plurality of data fields, among which a particular data field is indicated at 30. The list components 21–26 have pointers in the respective pointer fields and data in the respective data fields. The data are for a plurality of queues and form texts of the respective list components 21–26. Let it be surmised for convenience of description that it is desired to search a desired one of the queues that comprises predetermined ones of the data, one from a predetermined data field of each of predetermined ones, such as the list components 21–26. According to sophisticated queue searching facilities, a pointer in a predetermined pointer field of a first list component, such as 21–24, specifies the head of a second list component, such as 24–26, as shown by solid lines A1–A2, B1–B2, and C1–C2. In contrast, a pointer used in this invention of a predetermined pointer field of the first list component specifies a predetermined pointer field, such as 27–29, of the second list component as depicted by broken lines A1–A2, B1–B2, and C1–C2. This list component 24 may be a first list component for the list components 25–26 and a second one for the list components 21–23.

Figure 3:
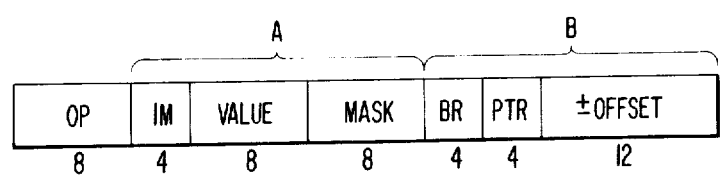
FIG. 3 illustrates a queue searching instruction for the computer, which may be a LOCATE instruction.

Referring also to FIG. 3, an instruction for searching a particular queue comprises a operation code OP of eight bits, a first operand A of 20 bits, and a second operand B, also of 20 bits. Let the particular queue be exemplified by the broken lines A1–A2 interconnecting the particular pointer fields of the respective particular list components 21, 24 and 26 having concern with the particular queue. As one of the particular data, let the particular queue comprise a particular datum stored in the particular data field 30 of the list component 24. For merely searching the particular queue, the second operand B consists of a base datum BR of four bits, a pointer datum PTR of four bits, and an offset datum OFFSET of twelve bits. The base datum BR specifies a common base address for the list components 21, 24 and 26 relating to the particular queue by specifying one of the base registers 11, which is preliminarily loaded with the base address. The pointer datum PTR specifies, relative to the base address, the particular pointer field of the particular list components 21 that has a particular datum standing at first in the particular queue. This may be done by specifying one of the pointer registers 12, which is preliminarily loaded with a first pointer address specifying the location in the main memory 10 of the last-mentioned pointer field relative to the base address. The offset datum OFFSET specifies the particular data field, such as 30, of each particular list component relative to the particular pointer field, such as 28, thereof. Inasmuch as these data BR, PTR, and OFFSET are of the lengths equal to those in other general instructions, it is possible to simplify the hardware logics used for the queue searching operation. It will also be understood that the first pointer address and the pointers serve as a first displacement and that the offset datum OFFSET serves as a second displacement. Consequently, the memory 10 for memorizing the plurality of list components 21–26 may not necessarily be a main memory although the expression "main memory" will still be used hereunder.

Figure 4:
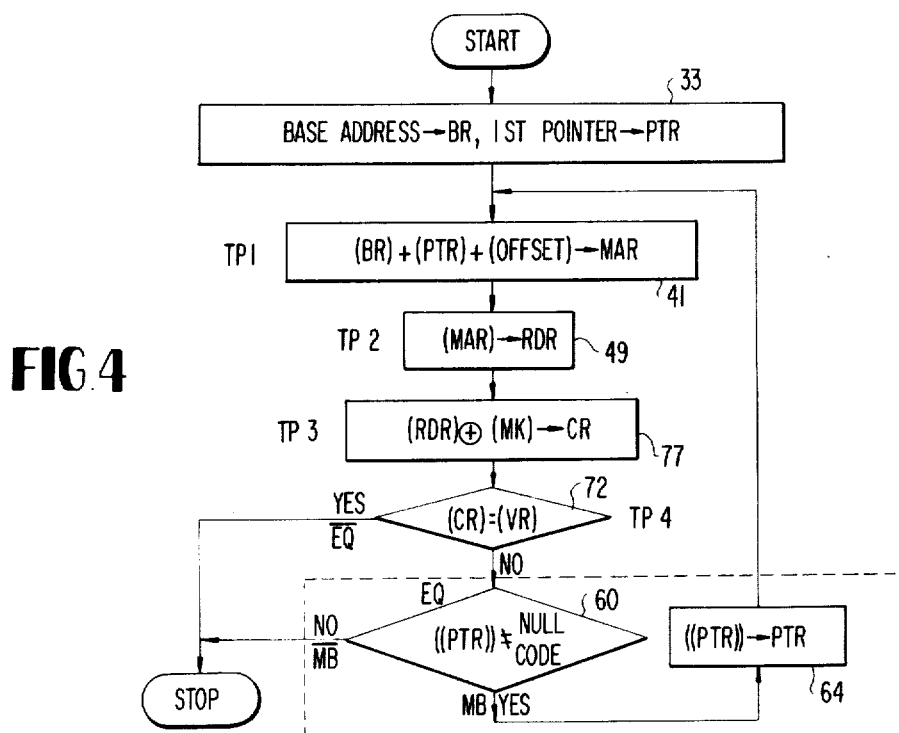
FIG. 4 is a flow chart for illustrating general operation, including the locate operation, of the computer in outline.
Figure 6:
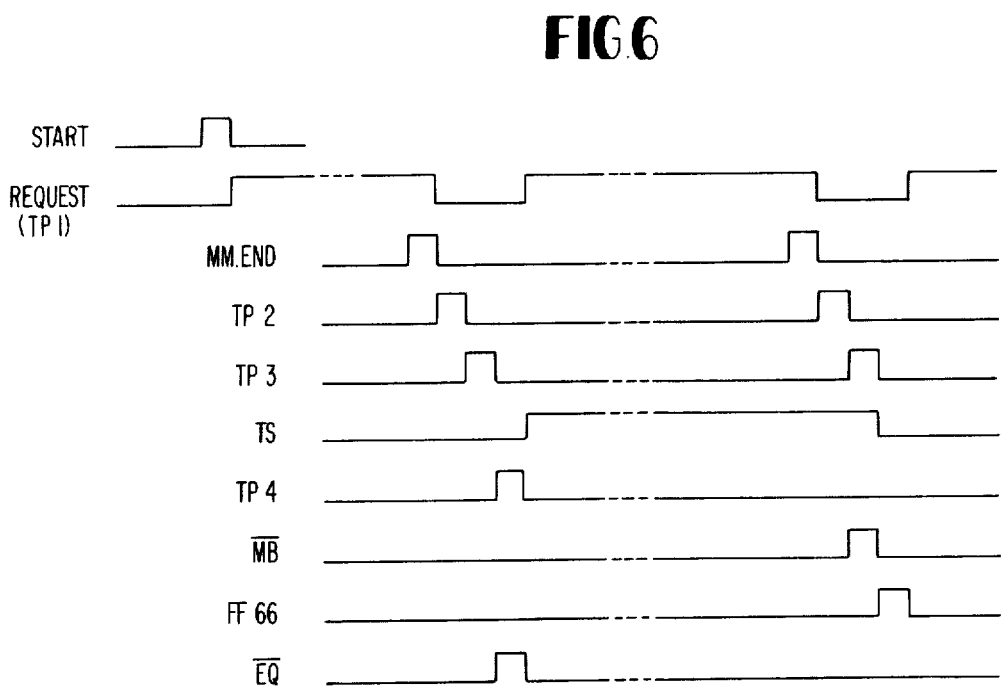
FIG. 6 shows pulse trains used in the illustrated portion of the control unit to put the computer into operation.
Figure 5:
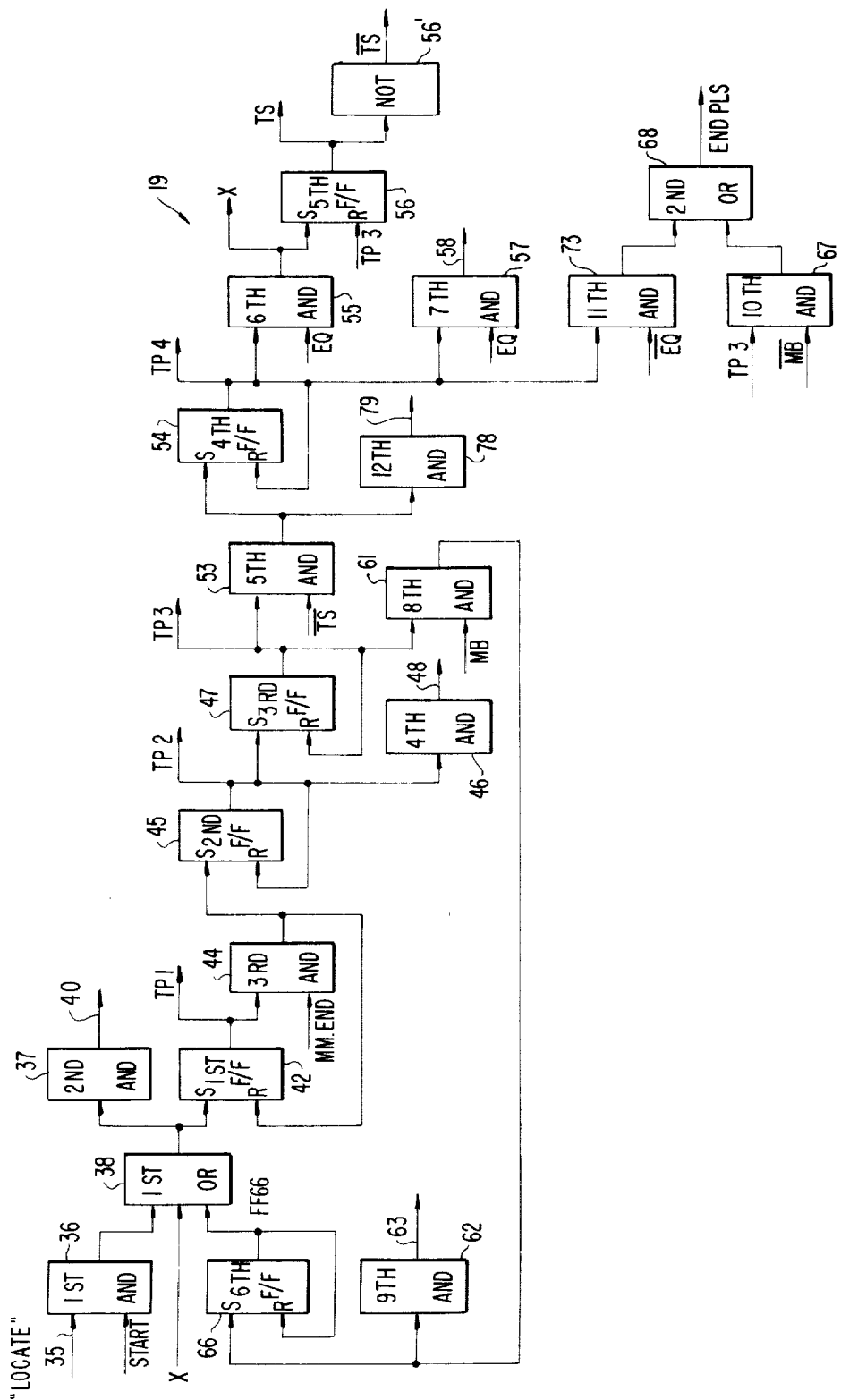
FIG. 5 is a detailed block diagram of a portion of a control unit of the computer.

Referring more in detail to FIG. 1 and also to FIGS. 4 through 6, the instruction register 13 comprises a code, a base, a pointer, and an offset data field or area. When the instruction register 13 is loaded with the instruction illustrated with reference to FIG. 3, the operation code OP, base datum BR, pointer datum PTR, and offset datum OFFSET are placed in the code, base, pointer, and offset data areas as shown in FIG. 1. The base and pointer data BR and PTR are decoded to load one each of the base and pointer registers 31 and 32, depicted separately from the remaining ones of the base and pointer registers 11 and 12 for clarity of illustration, with the base address and with the first pointer address, respectively, preliminarily before execution of the instruction as indicated at 33 (FIG. 4). These preliminary operations will not be described any further because they are known in the art. The decoder 14 decodes the operation code OP to supply a command signal through a particular output lead 35 to a first AND gate 36 (FIG. 5) of the control unit 19. Supplied with a start pulse START (FIGS. 5 and 6) produced for one clock duration in the known manner in the control unit 19, the AND gate 36 supplies a signal to a second AND gate 37 through a first OR gate 38. In the meanwhile, the base and the first pointer addresses are supplied to the adder 15. The adder 15 is also supplied with the offset datum through a first switch 39 to which a "0" signal is also supplied. At this instant, the switch 39 selects the offset datum rather than the "0" signal in the manner later described. The adder 15 calculates a sum of the base and the first pointer addresses and the offset datum. The second AND gate 37 provided forward of the memory address register 16 makes the sum transfer to the register 16 through a lead 40 as indicated at 41 (FIG. 4). It will be understood that the second input (not shown) to AND gate 37 is a data signal. It should also be understood in conjunction with FIG. 4 that the content of a register is represented by a datum enclosed with a pair of single parentheses and that the content of the location is indicated by a datum enclosed with a pair of double parentheses.

Referring further to FIGS. 1 and 4 through 6, the signal of the first AND gate 36 sets a first R-S flip-flop 42 to make the latter produce a first timing pulse TP1 (FIGS. 4 through 6). It will be appreciated that the transfer mentioned above is carried out at the beginning of the timing pulse TP1 as written adjacent to the block 41. Responsive to the timing pulse TP1, the other portions of the control unit 19 produce a memory request signal REQUEST for reading the datum stored in the main memory 10 at the located identified by the content of the memory address register 16 into a data register 43. Under these circumstances, the datum read into the data register 43 is the particular datum that stands at first in the particular queue. The main memory 10 produces in the known manner a "memory operation" end signal MM.END (FIGS. 5 and 6) to supply the same to a third AND gate 44, which is already enabled by a set output of the flip-flop 42. An output signal of the third AND gate 44 sets a second R-S flip-flop 45. A set output of the second flip-flop 45 is fet back to the reset terminal thereof in order to make the set output last one clock duration and serve as a second timing pulse TP2 (FIGS. 4 through 6), which is supplied to a fourth AND gate 46 and to a third R-S flip-flop 47. The fourth AND gate 46 is disposed at the stage preceding the read register 17. An output signal of the fourth AND gate 46 is supplied through a lead 48 to the read register 17. This AND gate 46 makes the data register 43 transfer its content to the read register 17 as indicated at 49 (FIG. 4). It will again be understood that the second input (not shown) to AND gate 46 is a data signal. The third flip-flop 47 supplies a third timing pulse TP3 of one clock duration (FIGS. 4 through 6) to the read register 17 to transfer its content to a utilization circuit 50, a first comparator 51, and a second switch 52. The utilization circuit 50 may be an output device.

Referring still further to FIGS. 1, 2, and 4 through 6, a logic "1" first phase signal TS (FIGS. 5 and 6) produced in the manner presently described represents Phase 1 of the queue searching operation described hereinabove and illustrated in FIG. 4 outside a broken line block and in FIG. 6 in the left half and is supplied to a fifth AND gate 53 to make the third timing pulse TP3 set a fourth R-S flip-flop 54, which produces a fourth timing pulse TP4 of one clock duration (FIGS. 4 through 6). Enabled by the fourth timing pulse TP4, a sixth AND gate 55 supplies an output signal X to a fifth R-S flip-flop 56 to set the latter and to thereby produce a second phase signal TS representative of Phase 2 of the queue searching operation described in the following and illustrated in FIG. 4 in the broken line block and in FIG. 6 in the right half. The first phase signal is produced through a NOT circuit 56'. The fifth flip-flop 56 is reset by the third timing pulse TP3. Besides the fifth flip-flop 56, the output signal X is supplied back to the first flip-flop 42 through the OR gate 38 to repeat the memory operation. The fourth timing pulse TP4, however, passes through a seventh AND gate 57 to supply a first switching signal to the first switch 39, which thereupon selects the "O" signal instead of the offset datum through a lead 58. The datum with which the read register 17 is loaded is therefore that particular pointer stored in the main memory 10 at the pointer field of the first particular list component 21 which specifies the particular pointer field 28 of the second particular list component 24.

Referring now to FIG. 7 in addition to FIGS. 1, 2, and 4 through 6, it should be mentioned here that a stopper or a null code is stored as a particular pointer in the particular pointer field of one of the particular list components, such as 21, 24, and 26 that has a particular datum placed at the end of the particular queue. The null code may be given by a "O" signal. As indicated at 60 (FIG. 4), the comparator 51 checks whether or not ((PTR)) obtained by a particular pointer of the first particular list component 21 with which the read register 17 was loaded as its content (RDR) is equal to a "O" signal (FIG. 1) supplied thereto. If not, the comparator 51 supplies a first control signal MB (FIGS. 1 and 4 through 7) to an eighth AND gate 61. The comparator 51 comprises NOT circuits for the respective bits $(RDR)_0, \ldots, (RDR)_h, \ldots$ of the read register content supplied thereto during the Phase 2 queue searching operation by the third timing pulse TP3. This is equivalent to the application to the comparator 51 of the "O" signal.

Referring again to FIGS. 1, 2, and 4 through 6, the third timing pulse TP3 enables the eighth AND gate 61. The control signal MB therefore enables a ninth AND gate 62 to supply a second switching signal to the second switch 52, which thereupon loads the one pointer register 31 with the particular pointer of the first particular list component 21 as indicated at 64 (FIG. 4). The contents of the read register 17 is also transferred through a lead 63. If it is desired to keep the first pointer address relating to the particular queue, the same may be transferred at the beginning of execution of the queue searching instruction from the one pointer register specified by the pointer datum to another that is one of the pointer registers. The control signal MB having passed through the eighth AND gate 61 is supplied also to a sixth R-S flip-flop 66 to make the latter supply one clock duration later a restart signal FF66 (FIGS. 5 and 6) to the second AND gate 37 and to the first flip-flop 42 through the OR gate 38.

Referring further to FIGS. 1, 2, and 4 through 7, the comparator 51 supplies a second control signal $\overline{MB}$ (FIGS. 1 and 4 through 7) to a tenth AND gate 67 when a particular pointer of the null code is stored in the pointer field of a particular list component (the control signal $\overline{MB}$ has an exclusive relation to the control signal MB). Supplied with the third timing pulse TP3, the tenth AND gate 67 produces, through a second OR gate 68, a queue search end signal ENDPLS, which may be supplied to a subsequent circuit, such as a flip-flop (not shown).

Referring now to FIGS. 1 and 3 again, it should be mentioned here that each general purpose register is for 32 bits, namely, for four bytes. The instruction depicted in FIG. 3 may be a LOCATE instruction for locating a preselected one of the particular data that is related to a reference given by the instruction on a condition, such as "equal", "high", "high/equal", "highest", "low", "low/equal", or "lowest", given also by the instruction. The operation code OP specifies the condition in addition to the queue searching operation. The first operand A comprises half byte datum IM of four bits and a value datum VALUE of eight bits, namely, of one byte. The value datum gives at least a portion of the reference. The half byte datum specifies that data length of the reference to which comparison should be carried out to determine the relation. When the half byte datum is "0000" to represent a zero value, the comparison is carried out only for the reference given by the datum VALUE. When the byte datum represents a finite value other than zero, the present computer can perform the comparison of a data length up to three bytes by specifying a particular general purpose register with the use of the decoded output of half byte datum IM (four bits). This operation may be realized as follows. First, the upper and lower parts of the contents stored in the specified general purpose register are concatenated one byte datum VALUE and one byte datum MASK of the instruction, respectively. In this case, the above comparison operation is carried out for string data (of three byte length) selected arbitrarily using the masking operation. The utilization circuit 50 comprises a second comparator 71 connected to the read register 17 and to the control unit 19 and supplied with the reference given either by the valve area VR alone or by cooperation of the valve area and the one specified general purpose register.

Referring also to FIGS. 4 through 6 and additionally afresh to FIG. 8, the content of the read register 17 is supplied to the second comparator 71 in the manner described above by the third timing pulse TP3 producing during the Phase 1 queue searching operation. When supplied with a control signal from the control unit 19 indicative of "equal" as the condition for comparison, the second comparator 71 compares the supplied reference with the particular datum with which the read register 17 is loaded. The second comparator 71 comprises EXCLUSIVE OR gates for the respective bits of the reference designated in FIG. 8 by $(VR)_0, \ldots, $ and $(VR)_7$ and the corresponding bits of an inverted read register content represented by $(\overline{CR})_0, \ldots, $ and $(\overline{CR})_7$ for convenience of further description of this invention. When an equality is found, the preselected datum is located. The second comparator 71 now produces, as indicated at 72 (FIG. 4), an equality signal $\overline{EQ}$ (FIGS. 1, 4 through 6, and 8) indicative of this fact.

Together with the fourth timing pulse TP4, the equality signal is supplied to an eleventh AND gate 73 to produce, through the second OR gate 68, a locate end signal designated also by ENDPLS. When an unequality is found for one of the particular data, the second comparator 71 produces an unequality signal EQ, which is supplied to the sixth AND gate 55 to produce the output signal X. In response to the output signal X, the memory operation is restarted as described before. Also, the fifth flip-flop 56 is set to produce the second phase signal TS for initiating the Phase 2 queue searching operation. The unequality signal EQ is supplied also to the seventh AND gate 57 to produce the first switching signal.

Referring once again to FIGS. 1 and 3, the LOCATE instruction may specify a further condition for the comparison. The further condition is given by modification in a prescribed manner of one or more preselected bits of each particular datum. For instance, the preselected bits may be excluded from the comparison. The first operand A comprises a masking datum MASK of eight bits, namely, of one byte. As is the case with the value datum VALUE, the mask datum provides at least a portion of the preselected bits. If the preselected bits are of a data length longer than one byte and not longer than three bytes, a preselected-bit datum is given by cooperation of the half byte datum IM with the masking datum. The instruction register 13 still further comprises a preselected-bit area comprising, in turn, a masking data area MK. The half byte datum IM is common to the reference and the preselected-bit areas. The utilization circuit 50 comprises a masking circuit 75 connected to the read register 17 and supplied with a signal representative of the preselected bits either from the masking area MK alone or from a combination of the masking area and the one specified general purpose register. The utilization circuit 50 further comprises a comparison register 76 between the masking circuit 75 and the second comparator 71.

Referring to FIGS. 1 and 4 through 6, the content of the read register 17 is supplied to the masking circuit 75 by the third timing pulse TP3 produced during the Phase 1 queue searching operation. As will shortly be described, the masking circuit 75 masks the particular datum or carries out the prescribed modification thereon with the preselected bits to load the comparison register 76 with a masked particular datum as indicated at 77 (FIG. 4). The data transferred from the masking circuit 75 to the comparison register 76 is controlled by an output signal of the twelfth AND gate 78. Thus obtained data is supplied to the comparison register 76 through a lead 79. The fourth timing pulse TP4 supplies the masked particular datum to the second comparator 71. This is why "TP4" is written adjacent to the process 72 in FIG. 4. Next, the masking operation will be explained. According as each of the preselected bits is representative of logic "1" and "0", masking may be carried out by substituting a complement for the corresponding bit of the particular datum and by leaving the corresponding bit unchanged, respectively. The masking circuit 75 therefor comprises EXCLUSIVE OR gates (not shown). Alternatively, masking may be carried out by leaving a bit corresponding in the particular datum to each logic "1" preselected bit untouched while caring nothing (DON'T CARE) for a bit corresponding in the particular datum to each logic "0" preselected bit. In this latter case, the masking circuit 75 comprises a first and a second group of two-input AND gates (not shown) wherein each of the first-group AND gates is supplied with the corresponding bits, one from the read register 17 and the other from the preselected-bit area (MK), to supply a logic product output to the comparison register 76 while each of the second-group AND gates is supplied with the corresponding bits, one from the reference area (VR) and the other from the preselected-bit area (MK), to supply a logic product output directly to the second comparator 71 through a connection (not shown). In this connection, it should be pointed out that an R-S flip-flop, such as the fourth one 54, may be added to the illustrated portion of the control unit 19 when it is desired to lengthen for any additional operation, the duration of memory operation, which is designed to be about several clock durations in the example being illustrated.

Referring again to FIGS. 1 and 3, let it be surmised that the list components 21-26 have complicated data structures. It is possible even in this case to locate a preselected datum in a particular queue by the use of data descriptors described, for example, in U.S. Pat. No. 3,735,364 issued May 22, 1973, to Hiroshi HATTA et al, assignors to the instant assignee, or in detail in *IEEE Transactions on Computers*, Vol. C-22, No. 7 (July 1973), pp. 644-656. Although not specifically shown, the first operand A consists in this case of a base address datum BR$v$, a descriptor address datum BR$s$ of four bits, and an offset datum D$s$ of twelve bits, all for a first descriptor for a reference or a preselected-bit datum. As is the case with the base and pointer data BR and PTR, the base and descriptor address data specify one each of the base and the general purpose registers 11 and 12 loaded with the respective addresses. The offset datum D$s$ specifies the offset. The particular data read sequentially out by a second descriptor given by the second operand B is compared with the valve datum indirectly designated through a first descriptor given by the first operand A. In this case, any masking operation is not performed.

Finally, referring again to FIGS. 1 and 2 and afresh to FIG. 9, let it be described that a first list component 21 having a first specific pointer in a specific pointer field 81 thereof should be followed by a second list component 24 having in its specific pointer field 82 a second specific pointer indicative of a specific pointer field 83 of a third list component 25 as illustrated with broken lines in FIG. 9 rather than directly by the third list component 25 as depicted with solid lines. In other words, let it be desired to link the second list component 24 in a specific queue designated by the solid lines after the first line component 21 so that the previous queue indicated by the solid lines may become a new one specified by the broken lines. Let a content (GR$_{n+1}$) of the first GR$_{n+1}$ of the general purpose registers 12 be indicative of the first pointer field 81. Let a content (GR$_n$) of a second general purpose register GR$_n$ be indicative of the second specific pointer field 82. A link instruction LINK/GR$_n$, GR$_{n+1}$ is executed at first by storing the content (GR$_{n+1}$) in a working register (not shown) as indicated by a first double arrow 86 while retaining the content (GR$_{n+1}$) in the first register GR$_{n+1}$. Secondly, a content of the first pointer field 81 indicative of the third pointer field 83 of the third list component 25 is transferred to the second pointer field 82 as indicated by a second double arrow 87. In the third place, the content (GR$_n$) is stored in the first pointer field 81 as designated by a third double arrow 88. If it is desired to delink the second list component 24 from a specific queue indicated by the broken lines, a delink instruction DELINK/GR$_n$, GR$_{n+1}$ is executed through similar processes except the second process, which is carried out in a reversed order since so as to transfer the content of the second pointer field 82 indicative of the third field 83 of the list component 25 stored in the second pointer field 82 to the first pointer field 81.

While several embodiments of this invention have thus far been described with reference to the accompanying drawing illustrative of a single preferred embodiment of this invention, it will now be appreciated that transfer of a datum between two, such as GR$_n$ and GR$_{n+1}$, of the general purpose registers 12 makes it possible to carry out various other operations, such as rewriting of a datum in a list component. If it is unnecessary to rewrite a datum at a high speed, the memory may be a read-only memory.

What is claimed is:

1. An electronic digital computer capable of searching any of a plurality of queues in response to a single instruction specifying a base datum, a pointer datum, and an offset datum relating to a specific queue, each queue comprising predetermined ones of data, one data from a predetermined one of the data fields of each of predetermined ones of a plurality of list components, each list component having in addition to a plurality of data fields at least one pointer field having pointers, each particular pointer specifying, relative to said base datum, the particular pointer field of one of said predetermined list components that has one of said data next following in said specific queue, comprising:

a memory for storing said plurality of list components;

an instruction register for storing said single instruction, said single instruction being composed of an operation code specifying said specific queue to be searched and a condition of the search according to one of a plurality of conditions which may be preselected, a first operand code specifying reference values, and a second operand code specifying said base datum, said pointer datum and said off-set datum;

a plurality of base registers connected to said instruction register, one of said base registers being preliminarily loaded with that portion of the second operand code specifying said base datum;

a plurality of hardware registers connected to said instruction register, one of said hardware registers being preliminarily loaded with that portion of the second operand code specifying said pointer datum;

a decoder connected to said instruction register and responsive to said operation code for producing a command signal;

pointer reader means connected to said one base register, said one hardware register, and said memory and responsive to said command signal and the codes stored in said one base register and said one hardware register for successively reading said particular pointers out of said particular pointer fields stored in said memory;

pointer loading means connected to said memory and to said one hardware register and responsive to said command signal and to the successively read-out pointers for loading, in place of the code specifying said pointer datum, said one hardware register with codes specifying successively read-out pointers, one at a time;

data reader means connected to said instruction register, said one base register, said one hardware register and said memory and responsive to said command signal, that portion of said second operand code specifying said offset datum and the codes stored in said one base register and said one hardware register for sequentially reading said predetermined ones of data out of said data fields of each of said predetermined ones of a plurality of list components stored in said memory;

a read register connected to said memory for temporarily storing a sequentially read-out data from said memory;

a first comparator connected to said instruction register and said read register and responsive to said command signal, said first operand code and the sequentially read-out data temporarily stored in said read register for making a comparison according to one of said conditions.

2. An electronic digital computer as claimed in claim 1, further comprising means connected to said data reading means and to said first comparator for stopping the data reading operation of said data reading means when said first comparator generates an output according to one of said conditions.

3. An electronic digital computer as claimed in claim 1, wherein said first operand code further specifies a mask value identifying at least one preselected bit of a preselected one of said predetermined ones of data in order to locate a preselected datum that is related, when said at least one preselected bit is modified in a prescribed manner, to said reference according to said condition, further comprising:

masking means connected to said instruction register and said read register and responsive to said command signal and that portion of said first operand code specifying said mask value for modifying in said prescribed manner said at least one preselected bit in each of said sequentially read-out data to produce masked data, said masked data being supplied to said first comparator.

4. An electronic digital computer as claimed in claim 1, wherein one of said pointers in the pointer field of one of said predetermined list components is a null code specifying the end of said specific queue being searched, further comprising:

a second comparator connected to said pointer reader means and responsive to a reference input and to the successively read-out pointers for generating an output signal when said null code is detected.

5. An electronic digital computer as claimed in claim 4, further comprising means connected to said data reading means and to said second comparator for stopping the data reading operation of said data reading means when said second comparator generates said output signal.

* * * * *